United States Patent [19]
Dixon

[11] 3,893,358
[45] July 8, 1975

[54] MECHANISM FOR UNLOADING PARTS FROM A MACHINE

[75] Inventor: Paul H. Dixon, Belvidere, Ill.

[73] Assignee: Dixon Automatic Tool, Inc., Rockford, Ill.

[22] Filed: Aug. 2, 1974

[21] Appl. No.: 494,081

[52] U.S. Cl. .................. 83/82; 83/157; 198/128; 214/1 BD
[51] Int. Cl. ............................................. B26d 7/06
[58] Field of Search .......... 214/1 BD, 18.22, 130 R; 198/128; 83/81, 82, 157, 165

[56] References Cited
UNITED STATES PATENTS

| | | |
|---|---|---|
| 3,148,571 | 9/1964 | Wallis ................................. 83/82 |
| 3,653,293 | 4/1972 | Wallis ................................. 83/82 |

Primary Examiner—Robert J. Spar
Assistant Examiner—George F. Abraham
Attorney, Agent, or Firm—Wolfe, Hubbard, Leydig, Voit & Osann, Ltd.

[57] ABSTRACT

A tray moves beneath a punch to catch a part which is knocked downwardly out of the punch as the latter is retracted. Thereafter, the tray is shifted rearwardly from the punch along a generally arcuate path and with an accelerated motion so as to throw the part away from the punch with a positive slinging action.

3 Claims, 4 Drawing Figures

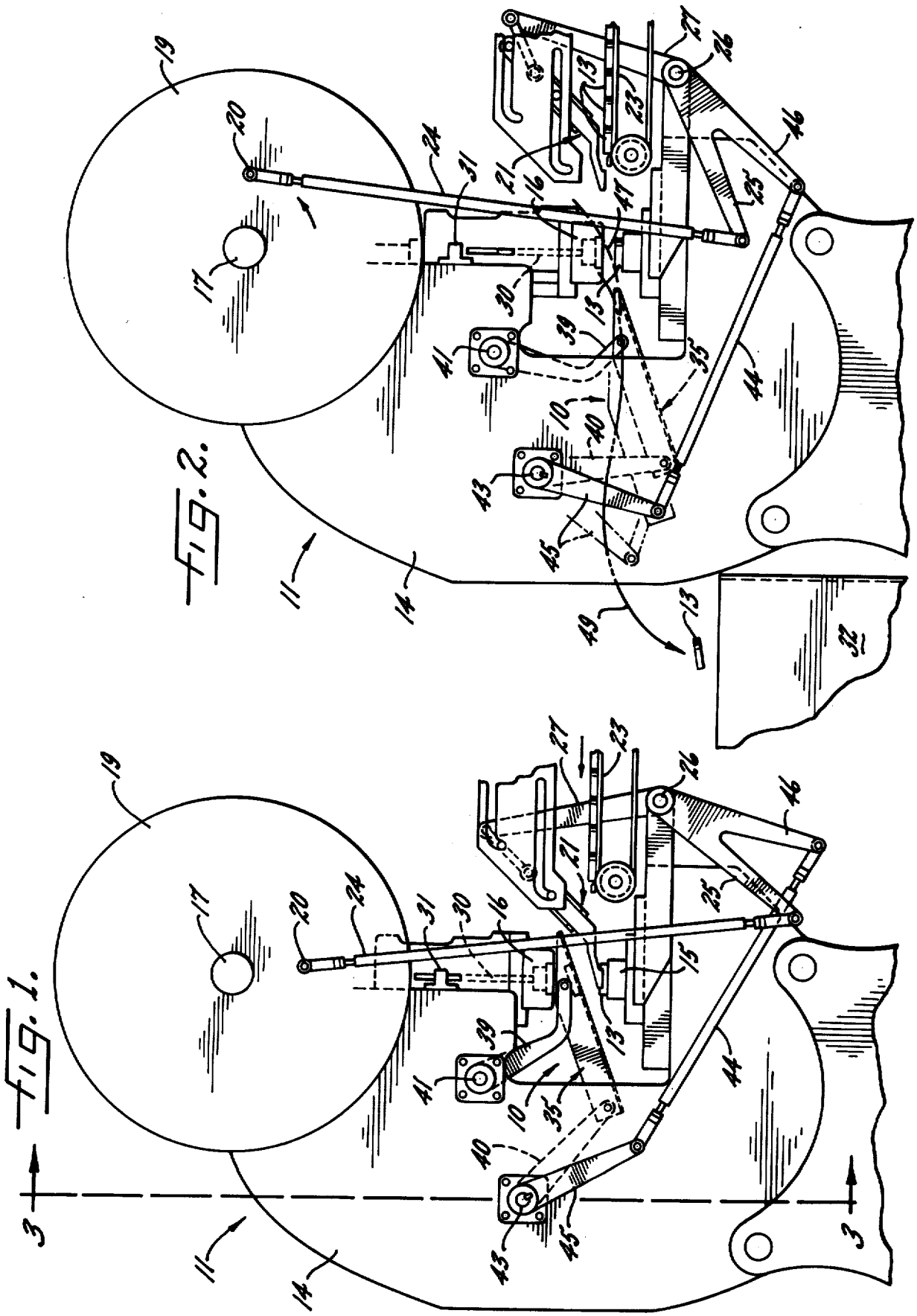

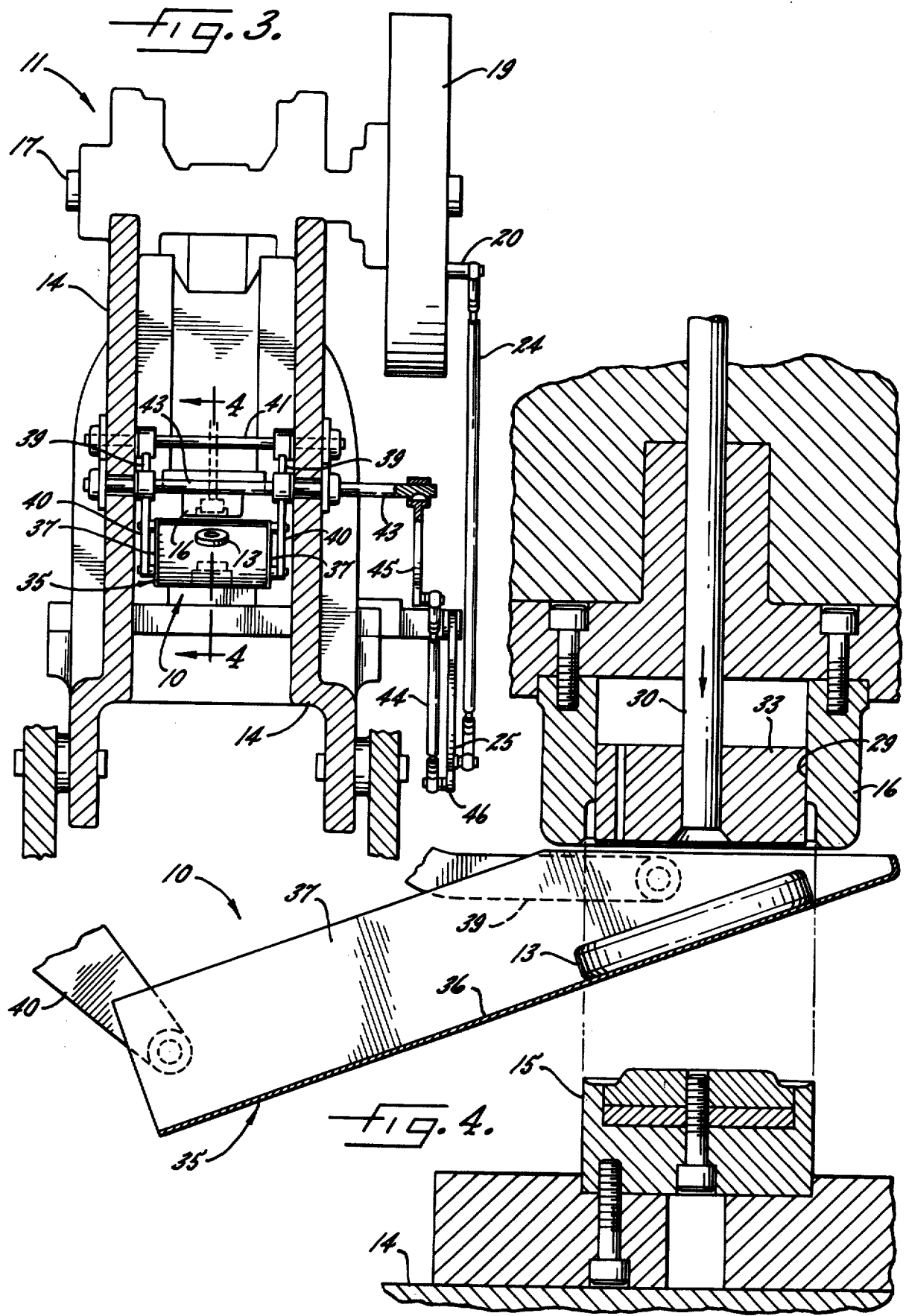

MECHANISM FOR UNLOADING PARTS FROM A MACHINE

BACKGROUND OF THE INVENTION

This invention relates to a mechanism for unloading a part from a machine of the type which includes a movable tool adapted to be reciprocated through upward and downward strokes. As the tool is retracted through its upstroke, the part moves upwardly with the tool and then drops downwardly away from the tool prior to being unloaded from the machine.

SUMMARY OF THE INVENTION

The general aim of the present invention is to provide a new and comparatively simple and inexpensive unloading mechanism which catches the dropped part and throws the part away from the machine with a more positive slinging action than prior unloading mechanisms of the same general type.

A more detailed object is to provide an unloading mechanism having a unique tray which moves beneath the tool to catch the dropped part and then moves away from the tool along a generally arcuate path and with an accelerated motion in order to sling the part away from the machine and to shift clear of the tool as the latter moves through its downstroke.

The invention also resides in the novel manner of mounting and driving the tray to produce an upward slinging motion to the part and to move the tray in timed relation with movement of the tool.

These and other objects and advantages of the invention will become more apparent from the following detailed description when taken in conjunction with the accompanying drawings.

BRIEF DESCRIPTION OF THE DRAWINGS

FIG. 1 is a fragmentary side elevation of an exemplary machine equipped with a new and improved unloading mechanism incorporating the novel features of the present invention.

FIG. 2 is a view similar to FIG. 1 but shows certain parts of the machine and the unloading mechanism in moved positions.

FIG. 3 is a fragmentary cross-section taken substantially along the line 3—3 of FIG. 1.

FIG. 4 is an enlarged fragmentary cross-section taken substantially along the line 4—4 of FIG. 3.

DETAILED DESCRIPTION OF THE PREFERRED EMBODIMENT

For purposes of illustration, the parts unloading mechanism 10 of the present invention is shown in the drawings as being associated with a machine such as a press 11 which acts upon a part 13 comprising two or more preassembled pieces and clinches the pieces together to form the part into a unitary assembly. The press comprises the usual C-shaped frame 14, a fixed lower die 15, and a vertically movable upper tool or punch 16 which reciprocates upwardly and downwardly to press the part against the lower die and effect clinching of the pieces.

The punch 16 is reciprocated by a drive comprising a power-rotated crank shaft 17 which is journaled by the frame 14. A flywheel 19 is rotatable with one end of the shaft 17 and carries an eccentric pin 20 which drives a loading mechanism 21 (FIGS. 1 and 2) for shifting consecutive parts 13 onto the fixed die 15 from a conveyor 23. For this purpose, a link 24 is pivotally connected at one end to the eccentric pin 20 and is pivotally connected at its opposite end to an arm 25 which is rigidly connected to a rock shaft 26 journaled by the frame 14, there being a second arm 27 connected between the rock shaft and the transfer mechanism 21. As the punch 16 moves through its upstroke, the transfer mechanism picks up the leading part 13 on the conveyor 23 and moves the part first rearwardly and then downwardly to place the part on the fixed die 15. The transfer mechanism then moves upwardly and outwardly so as to move clear of the punch prior to the latter moving downwardly and pressing the part against the fixed die to clinch the pieces together.

When the punch 16 moves through its upstroke, the newly clenched part 13 is retained within a cavity 29 (FIG. 4) in the punch and thus is retracted upwardly with the punch. As the punch nears the end of its upstroke, a slidable knock out rod 30 engages a fixed abutment 31 (FIG. 1) on the frame 14 and causes a knock out 33 (FIG. 4) to move downwardly within the cavity and thus force the part to fall downwardly out of the punch.

The present invention contemplates the provision of a comparatively simple and low cost unloading mechanism 10 which catches the part 13 dropped from the punch 16 and then throws the part away from the press 11 with a positive slinging action which insures ejection of the part. In the preferred embodiment, the unloading mechanism comprises a tray 35 which is adapted to move between a parts-receiving position (FIG. 1) and a parts-unloading position (FIG. 2) in timed relation with reciprocation of the punch, the tray catching the dropped part when in its receiving position and then moving along a generally arcuate path toward its unloading position so as to sling the part rearwardly away from the press 11 and into a container such as a barrel 32 (FIG. 2).

More specifically, the tray 35 is located at the rear side of the press 11 within an opening in the frame 14 and comprises a downwardly and rearwardly inclined bottom wall 36 (FIG. 4) and two upstanding side walls 37. The tray is supported for movement between its positions by a parallelogram linkage comprising a pair of forward links 39 (FIG. 1) and a downwardly and rearwardly spaced pair of rear links 40, the lower ends of both sets of links being pivotally connected to the side walls 37 of the tray. A shaft 41 is fixed to the frame 14 and pivotally supports the upper ends of the forward links 39 while a second shaft 43 is journaled by the frame and is keyed to the upper ends of the rear links 40. The shaft 43 is adapted to be oscillated back and forth by a linkage 44 pivotally connected at one end to an arm 45 on the shaft 43 and pivotally connected at its other end to an arm 46 which is integral with the arm 25.

With the foregoing arrangement, the tray 35 is shifted upwardly and forwardly to its receiving position (see FIG. 1) beneath the punch 16 as the latter approaches the top of its upstroke. As a result, the tray is in a position to catch the part 13 as the part is knocked out of the cavity 29 in the punch. When the punch begins its downstroke, the tray is very quickly shifted reversely toward its unloading position (see FIG. 2) along a generally upwardly concave arcuate path established by the parallel links 39 and 40, the line 47 in FIG. 2 indicating the approximate path followed by the forward end of the tray as the latter is shifted. The various linkage elements 20, 24, 25, 26, 46, 44, 45, 43 and 40 between the shaft 17 and the tray 35 cause the motion of the tray to be accelerated with respect to that of the punch so that the tray is moved out of the path of the downwardly moving punch before being hit by the latter. Indeed, the tray accelerates past the midpoint between its positions well before the punch reaches the midpoint of its downward stroke (See FIG. 2 wherein the instantaneous position of the tray with respect to the punch is shown in full lines and the extreme position of the tray is shown in phantom lines).

Such acceleration, together with the arcuate motion of the tray, causes the part 13 to be slung upwardly and rearwardly from the tray before the part falls downwardly under the influence of gravity, the approximate path of the part being shown by the line 49 in FIG. 2. The part is slung upwardly with a positive action before it undertakes hardly any downward sliding motion in the tray and thus it can readily clear the press frame 14 and be delivered into a relatively high container 32. Also, the upward slinging motion imparted to the part insures that the part will be ejected from the tray even if the part is coated with heavy oil as frequently is the case.

I claim as my invention:

1. A mechanism for unloading a part from a machine having a movable tool and having a drive for reciprocating the tool through upward and downward strokes, the part being carried upwardly with the tool as the latter moves upwardly and then dropping downwardly from the tool, said mechanism comprising a downwardly inclined tray, means mounting said tray on said machine for movement along an upwardly concave and generally arcuate path from a part-receiving position to a part-unloading position, said tray being located beneath said tool when in said receiving position and being located out of the path of the tool when in said unloading position, and means connecting said tray to said drive and operable to move said tray back and forth between said positions and along said path in timed relation with reciprocation of said tool whereby the tray first moves to said receiving position to catch the part dropped from the tool and then moves toward said unloading position to carry the part downwardly and then sling the part upwardly and to clear the tool as the latter moves through its downward stroke.

2. A mechanism as defined in claim 1 in which said mounting means comprise a parallelogram linkage pivotally connected between said tray and said machine, said connecting and moving means being operable to oscillate said linkage back and forth.

3. A mechanism as defined in claim 2 in which said connecting and moving means include a pivoted linkage connected between said parallelogram linkage and said drive and operable to accelerate the motion of said drive to cause said tray to move midway between its positions before said tool has been moved midway between its stroke.

* * * * *